(12) United States Patent
LaVere et al.

(10) Patent No.: US 8,794,669 B2
(45) Date of Patent: Aug. 5, 2014

(54) BREAK AWAY DASH PANEL

(71) Applicants: Michael J. LaVere, Hagerstown, IN (US); Bruce A. Crume, Portage, MI (US); Steven R. Siler, Charlotte, MI (US)

(72) Inventors: Michael J. LaVere, Hagerstown, IN (US); Bruce A. Crume, Portage, MI (US); Steven R. Siler, Charlotte, MI (US)

(73) Assignee: Spartan Motors, Inc., Charlotte, MI (US)

( * ) Notice: Subject to any disclaimer, the term of this patent is extended or adjusted under 35 U.S.C. 154(b) by 0 days.

(21) Appl. No.: 13/967,525

(22) Filed: Aug. 15, 2013

(65) Prior Publication Data

US 2014/0049068 A1     Feb. 20, 2014

Related U.S. Application Data

(60) Provisional application No. 61/683,684, filed on Aug. 15, 2012, provisional application No. 61/683,701, filed on Aug. 15, 2012.

(51) Int. Cl.
| | | |
|---|---|---|
| *B60R 21/045* | (2006.01) | |
| *B60R 21/206* | (2011.01) | |
| *B60R 21/231* | (2011.01) | |
| *B60R 21/20* | (2011.01) | |
| *B60R 21/00* | (2006.01) | |

(52) U.S. Cl.
CPC ....... *B60R 21/206* (2013.01); *B60R 2021/0051* (2013.01); *B60R 21/231* (2013.01); *B60R 2021/0074* (2013.01); *B60R 21/045* (2013.01); *B60R 21/20* (2013.01)
USPC .......................................... 280/752; 280/751

(58) Field of Classification Search
USPC .................................. 280/748, 750, 751, 752
See application file for complete search history.

(56) References Cited

U.S. PATENT DOCUMENTS

| | | | |
|---|---|---|---|
| 4,198,075 A | 4/1980 | Kob et al. | |
| 5,482,319 A | 1/1996 | Yoshimura et al. | |
| 5,697,667 A * | 12/1997 | Beaudet et al. | ............... 280/752 |
| 6,145,880 A * | 11/2000 | White et al. | ................... 280/752 |
| 6,296,277 B1 * | 10/2001 | Bittinger et al. | .............. 280/748 |
| 6,299,208 B1 * | 10/2001 | Kasahara et al. | .............. 280/752 |
| 6,554,352 B2 * | 4/2003 | Nagy | ........................ 296/203.02 |
| 7,036,865 B2 * | 5/2006 | Sato et al. | ........................ 296/70 |

(Continued)

FOREIGN PATENT DOCUMENTS

| | | |
|---|---|---|
| EP | 0 684 164 A1 | 11/1995 |
| JP | 2001106013 A | 4/2001 |

*Primary Examiner* — Toan To
(74) *Attorney, Agent, or Firm* — Reinhart Boerner Van Deuren P.C.

(57) ABSTRACT

A dash assembly for the occupant area of a vehicle including a stationary section, a moveable section, first interface and a second interface is provided. The moveable section includes at least one contact zone configured to be engaged by a driver's knee in the event of an accident to absorb forces from the driver's knee. The first interface is between the stationary section and the moveable section and secures the moveable section to the stationary section at a first location. The second interface is between the stationary section and the moveable section and secures the moveable section to the stationary section at a second location spaced away from the first location. The second interface is configured to release prior to the first interface upon sufficient forces being applied to the at least one contact zone during an accident.

16 Claims, 11 Drawing Sheets

(56) References Cited

U.S. PATENT DOCUMENTS

| | | | |
|---|---|---|---|
| 7,185,917 B2 * | 3/2007 | Nagata et al. | 280/748 |
| 7,431,338 B2 * | 10/2008 | Hayata | 280/752 |
| 7,762,577 B2 * | 7/2010 | Kato et al. | 280/730.1 |
| 7,874,587 B2 * | 1/2011 | Miki et al. | 280/752 |
| 7,954,851 B2 * | 6/2011 | Sato | 280/752 |
| 8,251,399 B2 * | 8/2012 | Babian | 280/752 |
| 8,590,931 B2 * | 11/2013 | Brant et al. | 280/752 |
| 2009/0146400 A1 | 6/2009 | Knowlden | |

* cited by examiner

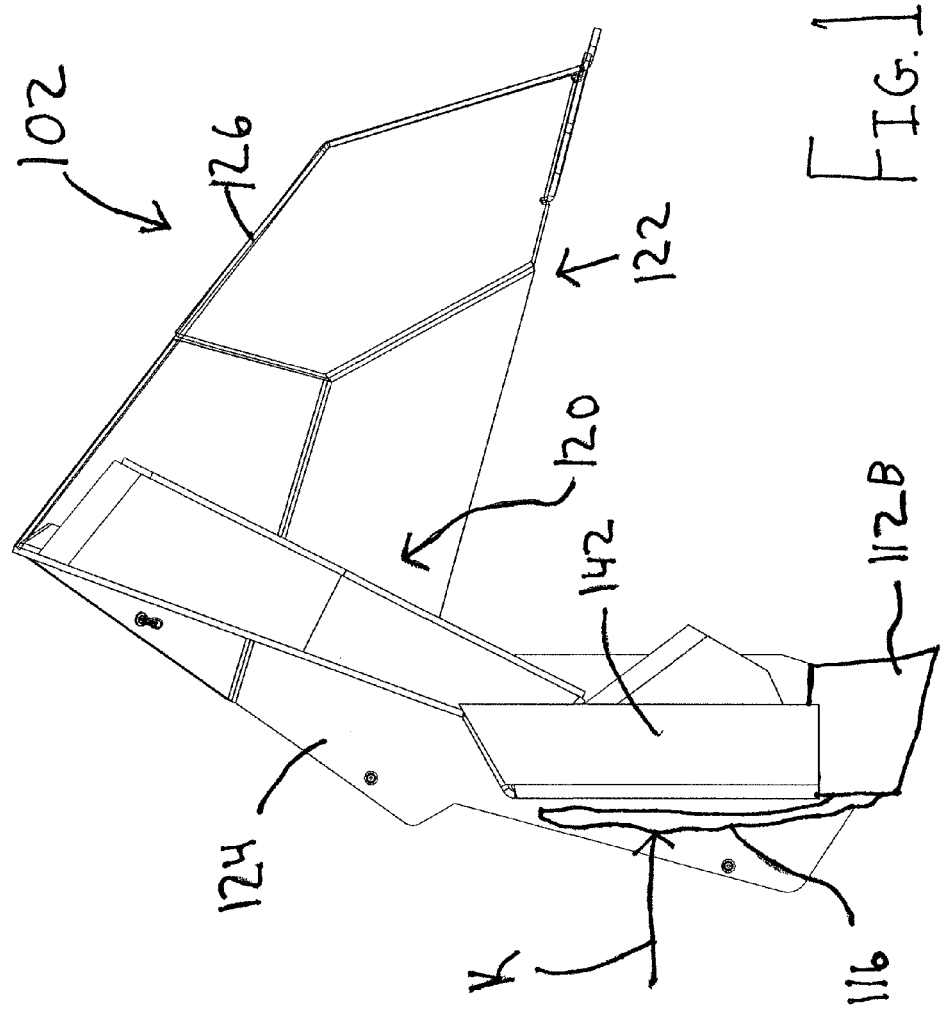

US 8,794,669 B2

BREAK AWAY DASH PANEL

CROSS-REFERENCE TO RELATED PATENT APPLICATIONS

This patent application claims the benefit of U.S. Provisional Patent Application Nos. 61/683,684, filed Aug. 15, 2012, and 61/683,701, filed Aug. 15, 2012, the entire teachings and disclosures of which are incorporated herein by reference thereto.

FIELD OF THE INVENTION

This invention generally relates to vehicles and more particularly to dashes for the occupant area for vehicles.

BACKGROUND OF THE INVENTION

In the event of a front end collision for a vehicle, it is possible for the drive to have forward motion such that the driver's knees will contact the dash within the vehicle's occupant area. This impact can cause damage to the driver's knees and is one of the most prominent injuries incurred by drivers of vehicles such as commercial trucks or fire trucks.

The present invention relates to improvements over the state of the art relating to safety mechanisms for protecting the knees of the driver in these types of situations.

BRIEF SUMMARY OF THE INVENTION

A new and improved dash assembly for the occupant area (e.g. cab) of a vehicle is provided. More particularly, a new and improved dash assembly that provides improved protection for a driver's knees in the event of an accident is provided. Even more particularly, a new and improved dash assembly that provides improved protection for a driver's knees in the event of an accident by providing a releasable portion for the dash is provided.

In one particular embodiment, a dash assembly for the occupant area of a vehicle including a stationary section, a moveable section, first interface and a second interface is provided. The moveable section includes at least one contact zone configured to be engaged by a driver's knee in the event of an accident to absorb forces from the driver's knee. The first interface is between the stationary section and the moveable section and secures the moveable section to the stationary section at a first location. The second interface is between the stationary section and the moveable section and secures the moveable section to the stationary section at a second location spaced away from the first location. The second interface is configured to release prior to the first interface upon sufficient forces being applied to the at least one contact zone during an accident.

In one embodiment, the first interface provides a hinge mechanism.

In one embodiment, the first interface is a joint in the form of a weld seam formed between the stationary section and the moveable section. In other embodiments, the first interface could be a bend between two portions of a single piece of material where one of the portions forms part of the stationary section and the other one of the portions forms part of the movable section. The bend forms a hinge between the two portions.

In one embodiment, the first interface is substantially horizontally oriented and the second interface is substantially vertically oriented.

In one embodiment, the at least one contact zone is positioned vertically below the first interface and is substantially vertically oriented.

In one embodiment, the second interface is provided by an overlapping interface between the stationary section and the moveable section and includes at least one mechanical connection that extends through the overlapping interface.

In one embodiment, the at least one mechanical connection will release when the second interface releases to permit relative motion between the stationary section and the moveable section.

In one embodiment, the stationary section includes mounts for securement to the rest of the occupant area.

In one embodiment, the moveable section has a rear facing rear face and a front facing front face. The stationary section extends forward of the moveable section. The rear facing rear face facing the driver when mounted within the occupant area of a vehicle.

In one embodiment, the moveable section includes a pair of contact zones that are horizontally spaced apart from one another with a steering column channel being formed therebetween. One of the contact zones being positioned to align with a first knee of the driver and the other one of the contact zones being positioned to align with a second knee of the driver.

In another embodiment, an occupant area for a vehicle is provided. The occupant area includes a dash assembly and a knee airbag assembly. The dash assembly includes a stationary section, a moveable section, a first interface and a second interface. The moveable section includes at least one contact zone configured to be engaged by a driver's knee in the event of an accident to absorb forces from the driver's knee. The first interface is between the stationary section and the moveable section and secures the moveable section to the stationary section at a first location. The second interface is between the stationary section and the moveable section and secures the moveable section to the stationary section at a second location spaced away from the first location. The second interface is configured to release prior to the first interface upon sufficient forces being applied to the at least one contact zone during an accident. The knee airbag assembly includes at least one airbag having a deployed state in which the airbag is located in front of the at least one contact zone.

In one embodiment, the knee airbag assembly includes a knee airbag mount. The moveable section is attached to the knee airbag mount at a third interface spaced away from the first and second interfaces. The knee airbag mount is configured to deform, at least partially, with the moveable section when the second interface releases due to sufficient forces being applied to the at least one contact zone. The knee airbag mount may provide the or another contact zone for impact by the driver's knees.

In one embodiment, the first interface is a substantially horizontally oriented joint in the form of a weld seam formed between the stationary section and the moveable section and the second interface is substantially vertically oriented. The second interface, absent the mechanical connections, may provide a sliding/releasing interface between the stationary and moveable sections.

In one embodiment, the at least one contact zone is positioned vertically below the first interface and is substantially vertically oriented. The at least one contact zone is vertically above the knee airbag assembly prior to deployment of the at least one air bag.

In one embodiment, the second interface is provided by an overlapping interface between the stationary section and the moveable section and includes at least one mechanical connection that extends through the overlapping interface.

In one embodiment, the at least one mechanical connection will release when the second interface releases to permit relative motion between the stationary section and the moveable section.

In one embodiment, the occupant area further includes a vehicle framework to which the dash assembly and knee airbag assembly are operably mounted. The stationary section includes at least one mount for securement of the dash assembly to the vehicle framework. The stationary section remains in a fixed orientation relative to the vehicle framework when the mechanical connection releases.

In one embodiment, the occupant area further includes a windshield that has a portion through which the driver looks during normal driving that is positioned directly in front of the driver when the driver is seated in a seat of the vehicle. The moveable section has a rear facing rear face and a front facing front face opposite the rear facing rear face. The stationary section extends forward of the moveable section towards the portion of the windshield through which the drive typically looks. The rear facing rear face facing the driver when the driver is positioned within the occupant area.

In one embodiment, the moveable section includes a pair of contact zones that are horizontally spaced apart from one another with a steering column channel being formed therebetween. One of the contact zones is positioned to align with a first knee of the driver and the other one of the contact zones is positioned to align with a second knee of the driver. The knee airbag assembly includes a pair of knee airbags with one knee airbag associated with one of the contact zones and the other one of the knee airbags associated with the other one of the contact zones.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 11 is a profile illustration of the dash assembly of FIG. 8 and a portion of the knee air bag assembly after a front end collision with the rear moveable panel section and knee airbag assembly deformed.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
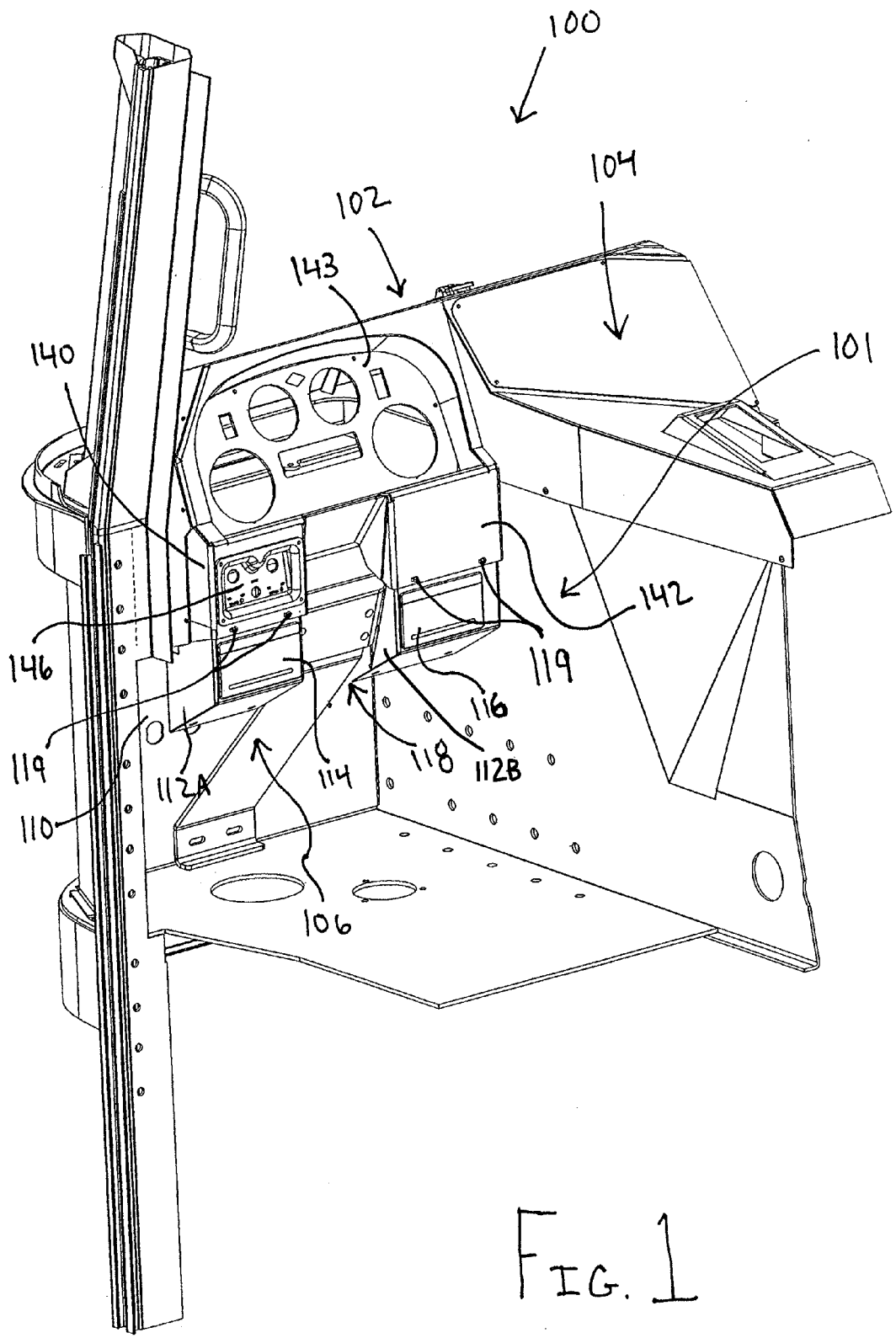
FIG. 1 is a partial perspective illustration of an occupant area of a vehicle including a dash assembly according to an embodiment of the present invention.

FIG. 1 illustrates a driver side portion of an occupant area 100 for a vehicle that defines a driver's occupant area space 101. While not illustrated, the driver's occupant area space 101 would include a steering column (e.g. a steering wheel), a seat for the driver, gauges and instrumentation as well as break and gas pedals.

The illustrated portion of the occupant area 100 includes a dash assembly 102, a center dash 104 and a knee airbag assembly 106 mounted to framework 110 of the vehicle.

The dash assembly 102 and knee airbag assembly 106 are configured to absorb impact forces and energy in the event of a front end collision. As such, the dash assembly 102 and knee airbag assembly 106 are configured to deform in the event of a front end collision.

The knee airbag assembly 106 includes knee airbag mounts 112A, 112B to which a pair of knee airbags 114, 116 are mounted. The knee airbags 114, 116 are on opposite sides of a steering column receiving channel 118. As such, the left knee airbag 114 is provided for one of the driver's knees while the right knee airbag 116 is provided for the other one of the driver's knees when the driver is seated in the occupant area 100.

The dash assembly 102 is attached to a top portion of the knee airbag assembly 106 by mechanical fasteners 119. The dash assembly 102 registers horizontally against a generally vertically oriented side of the center dash 104

With reference to FIGS. 2-6, the dash assembly 102 includes a rear moveable panel section 120 and a front stationary section 122. The rear moveable panel section 120 is positioned in a rearward position relative to the front stationary section 122 such that the rear moveable panel section 120 is generally closer to the driver or seat of the vehicle than the front stationary section 122. The front stationary section 122 would be considered to be closer to the windshield of the vehicle than the rear moveable panel section 120.

The front stationary section 122 is an assembly of panels including a side panel 124 and a front top panel 126. The front stationary section 122 includes a pair of mounting flanges 128, 130 for mounting the dash assembly 102 to the framework 110 of the vehicle as illustrated in FIG. 1. The side panel 124 and top panel 126 are connected by a welded edge 130.

The rear moveable panel section 120 is also an assembly of panels. A rear fascia panel 132 generally surrounds a central area 134 in which the instrument cluster for the vehicle would be positioned. An offset panel 136 extends forward from a front surface of the rear fascia panel 132. An instrument cluster mounting panel 138 is connected on an opposite end of the offset panel 136 from the rear fascia panel 132. As such, the offset panel 132 operably connects the rear fascia panel 132 to the instrument cluster mounting panel 138.

The rear moveable panel section 120 includes a left pod 140 and a right pod 142. These pods 140, 142 are located vertically below the central area 134 where the instrument cluster is located. The instrument cluster 143 is illustrated in simplified form in FIG. 1. The left pod 140 defines an opening 144 in which a control panel 146 can be mounted (see FIG. 1). The control panel 146 could include on off switches, light switches or other relevant controls or switches for the vehicle. In the illustrated embodiment, the right pod 142 has a substantially planar exposed surface 148.

A steering column panel 150 is interposed between the left and right pods 140, 142. The steering column panel 150 and left and right pods 140, 142 combine to define the steering column receiving channel 118 through which a steering column would extend.

In the illustrated embodiment, all of the panels 132, 136, 138, 140, 142, 150 of the rear moveable panel section 120 are permanently attached to one another such as by welding to form a single unit.

Figure 2:
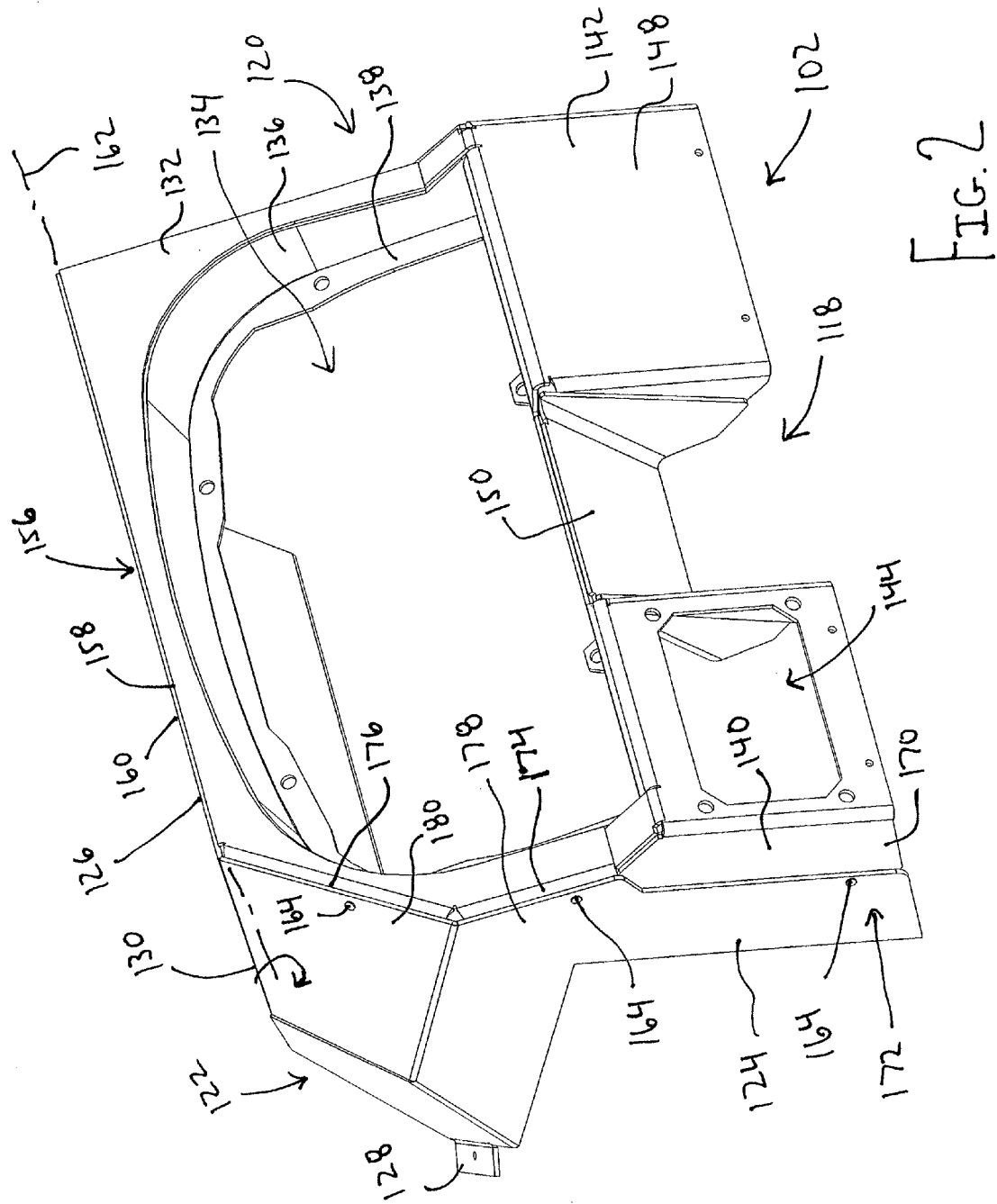
FIGS. 2 and 3 are perspective illustrations of the dash assembly of FIG. 1 removed from the occupant area of the vehicle.
Figure 3:
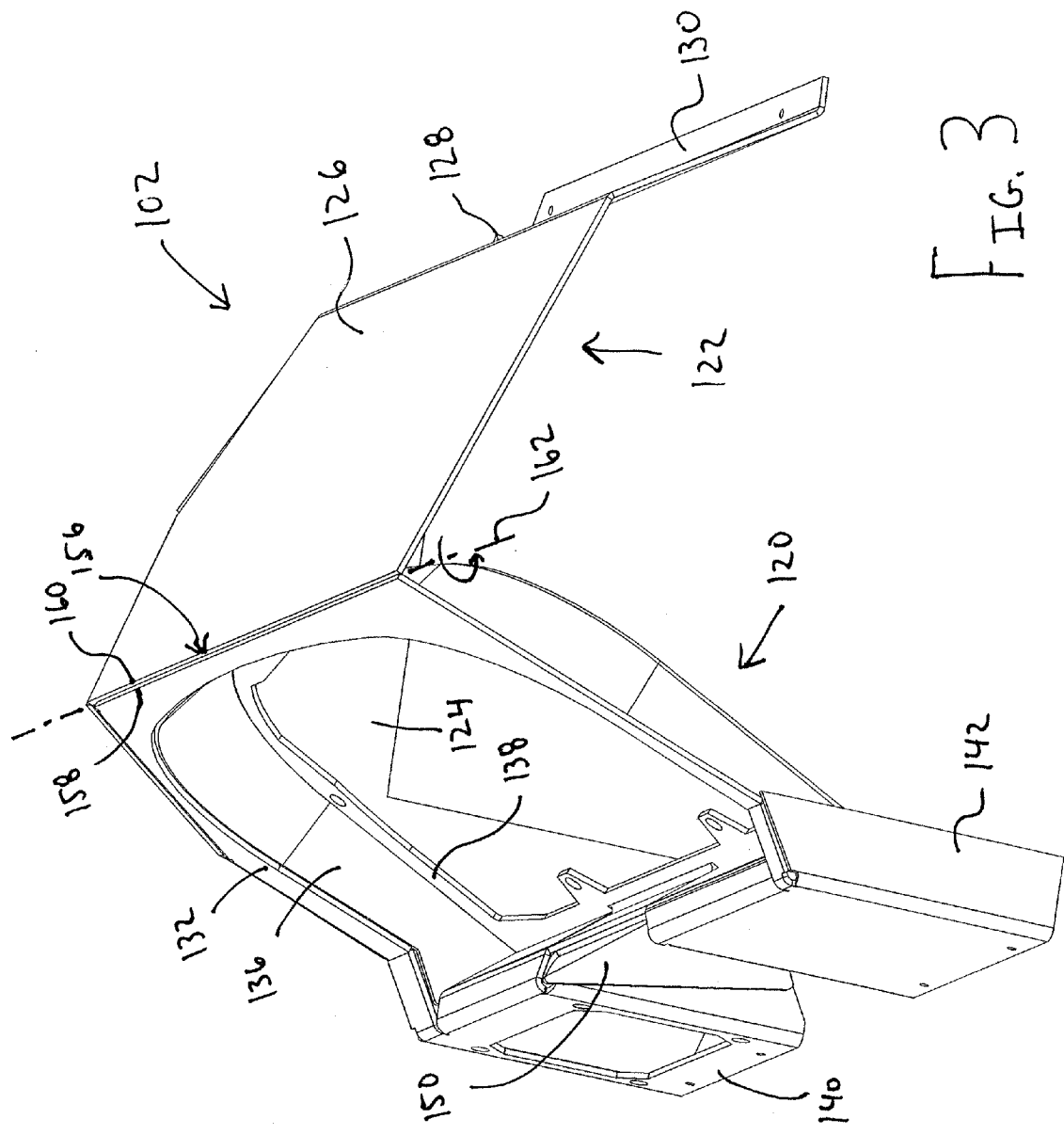
Figure 4:
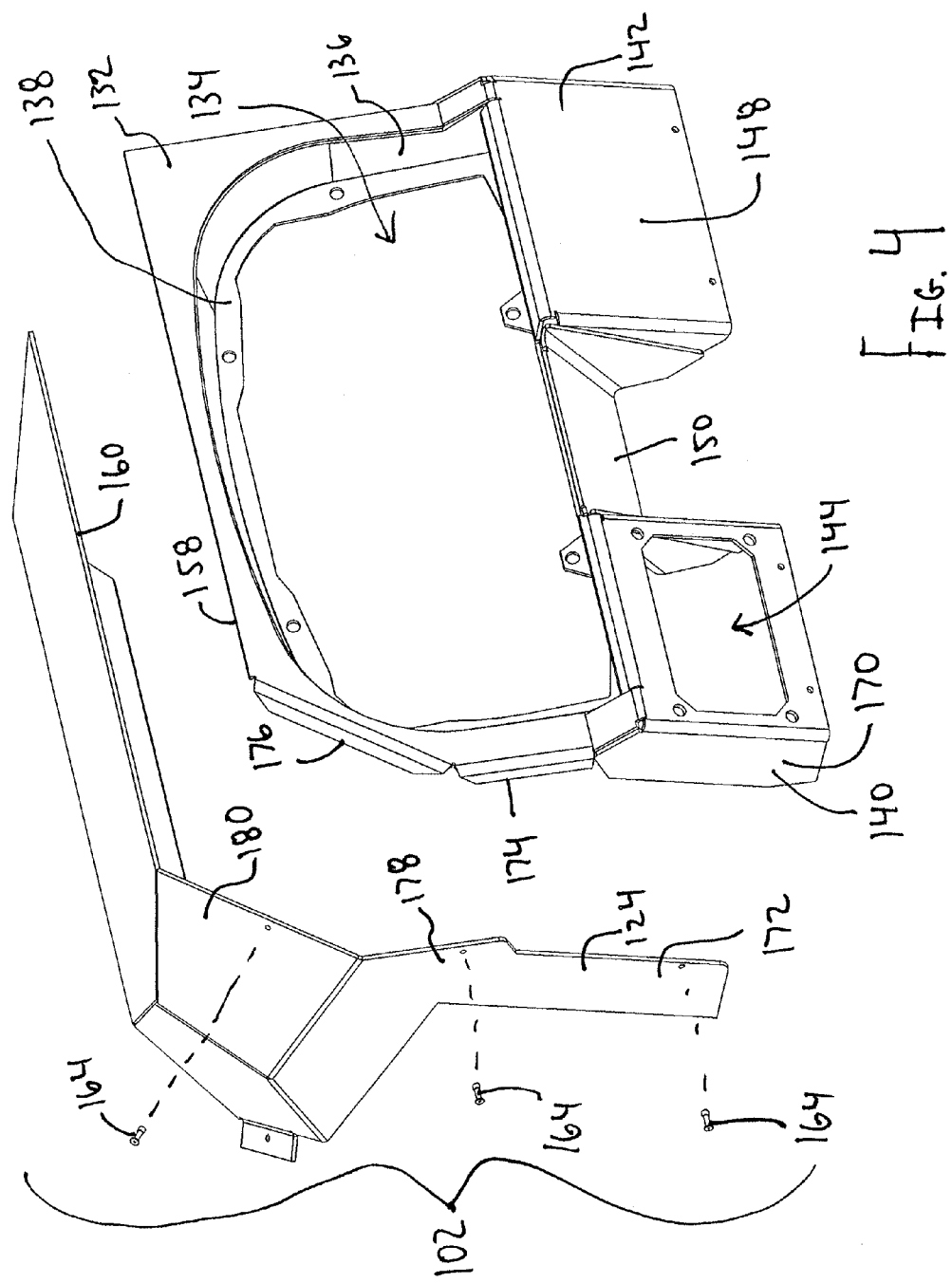
FIG. 4 is a partially exploded illustration of the dash assembly of FIGS. 2 and 3 illustrating the rear moveable panel section and the front stationary section.
Figure 5:
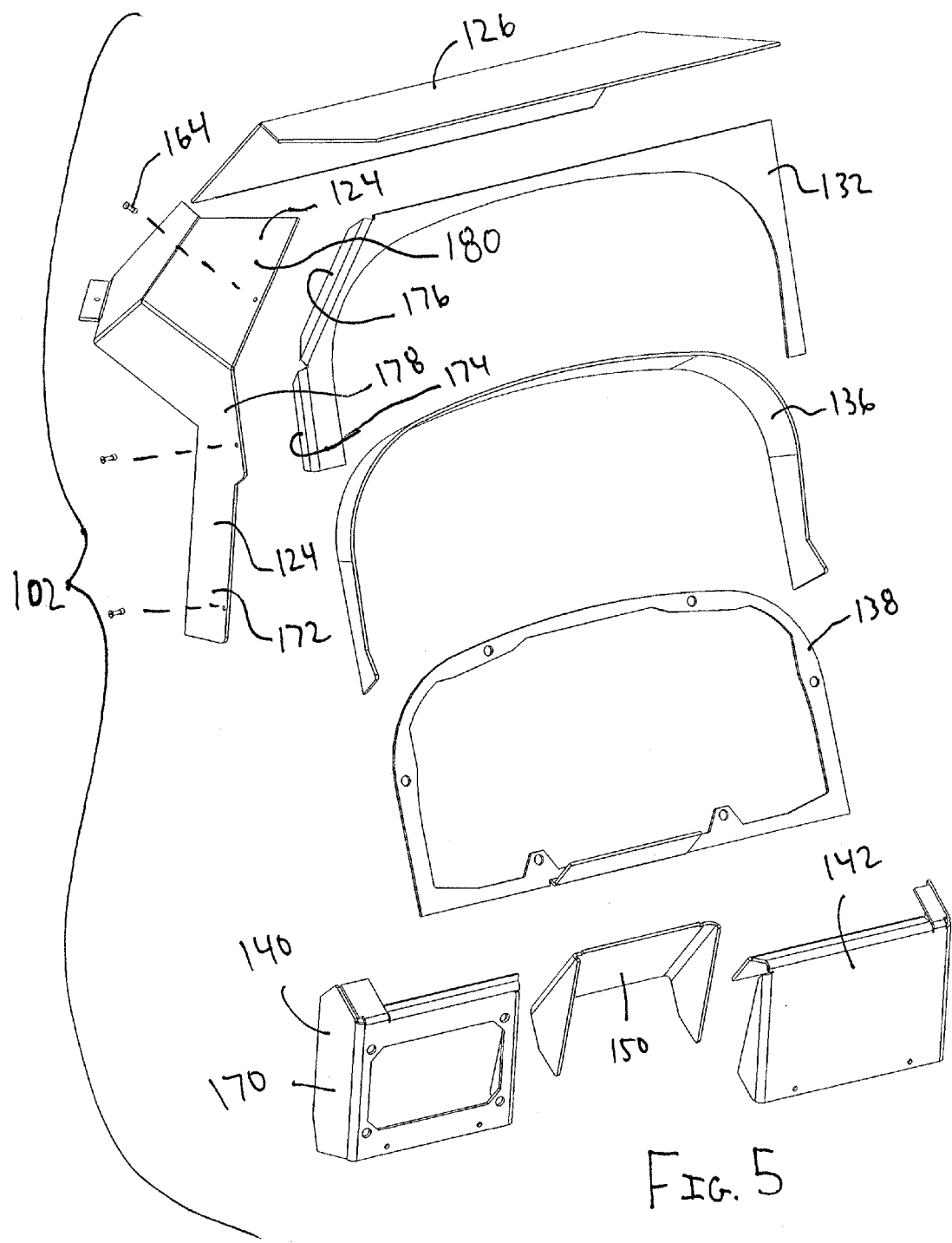
FIG. 5 is a fully exploded perspective illustration of the dash assembly of FIGS. 2-4.
Figure 6:
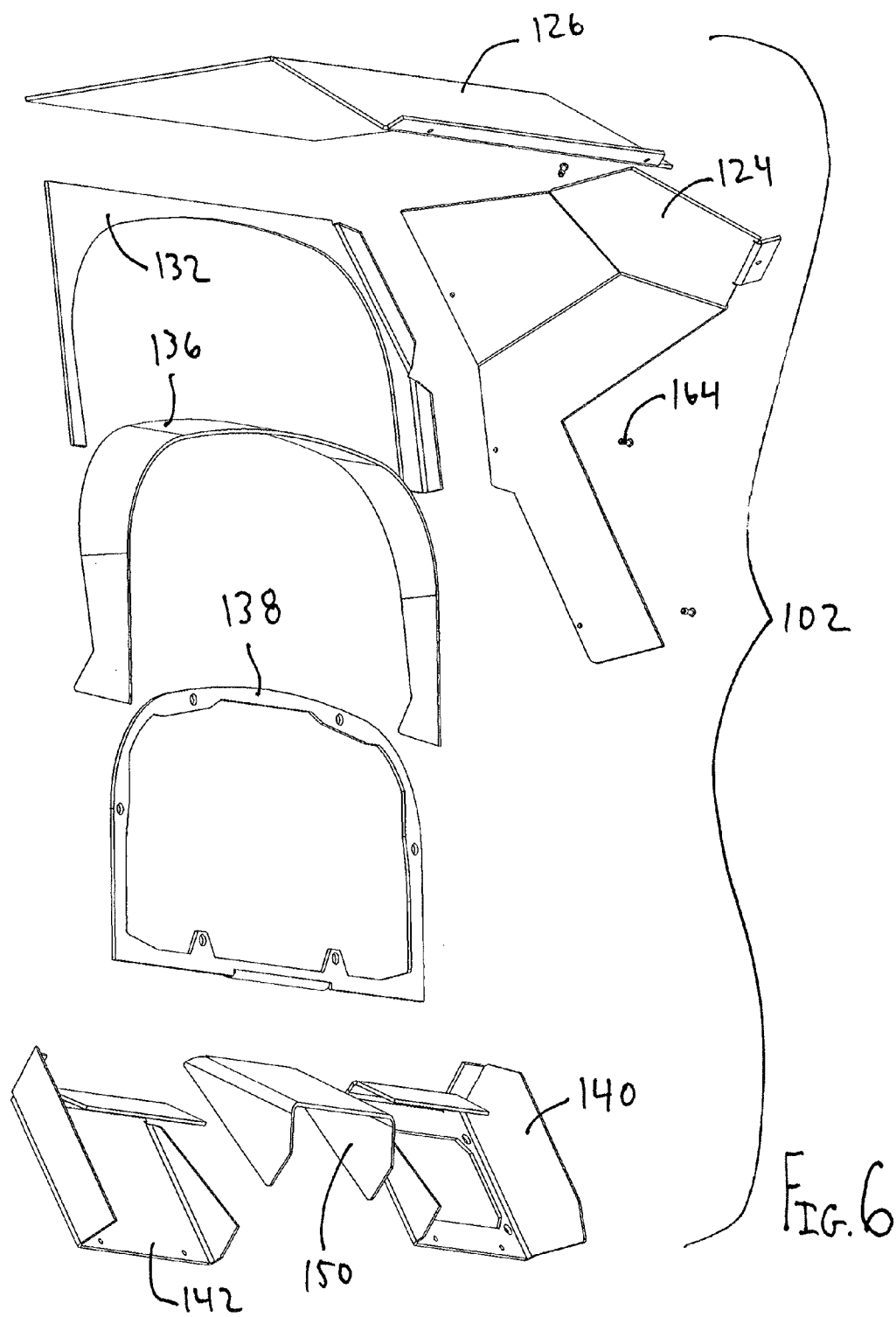
FIG. 6 is a fully exploded perspective illustration of the dash assembly of FIGS. 2-4.

With principle reference to FIGS. 2 and 3, the rear moveable panel section 120 is affixed to the front stationary section 122 at a first interface therebetween provided by a joint in the form of welded seam 156 in the illustrated embodiment. The welded seam 156 is formed between the top edge 158 of the rear fascia panel 132 and the top edge 160 of the front top panel 126. The welded seam 156 extends horizontally relative to the occupant area 100 and particularly relative to the seat. In other words, the welded seam 156 extends substantially parallel to a windshield (not shown) of the vehicle. In one embodiment, the rear fascia panel 132 and the top panel 126 could be formed from a single piece of material and connected by a bend. The bend would provide the first interface as well as a living hinge 162.

Additionally, a plurality of rivets 164 mechanically secure the rear moveable panel section 120 to the front stationary section 122 at a second interface. The rivets 164 mechanically secure a side of the rear moveable panel section 120 to the side panel 124 of the front stationary section 122. By using rivets 164, the entire seam between the side panel 124 and the rear moveable panel section 120 is not fixed and only a small portion of the seam therebetween is fixed limiting the mechanical securement between the components.

The welded seam 156 defines a hinge 162, illustrated in FIGS. 2 and 3 as a dashed line, between the front stationary section 122 and the rear moveable panel section 120. In the event of a front end impact or collision, the rear moveable panel section 120 can pivot via hinge 162 in a forward direction, i.e. into the front stationary section 122 to absorb energy.

Figure 9:
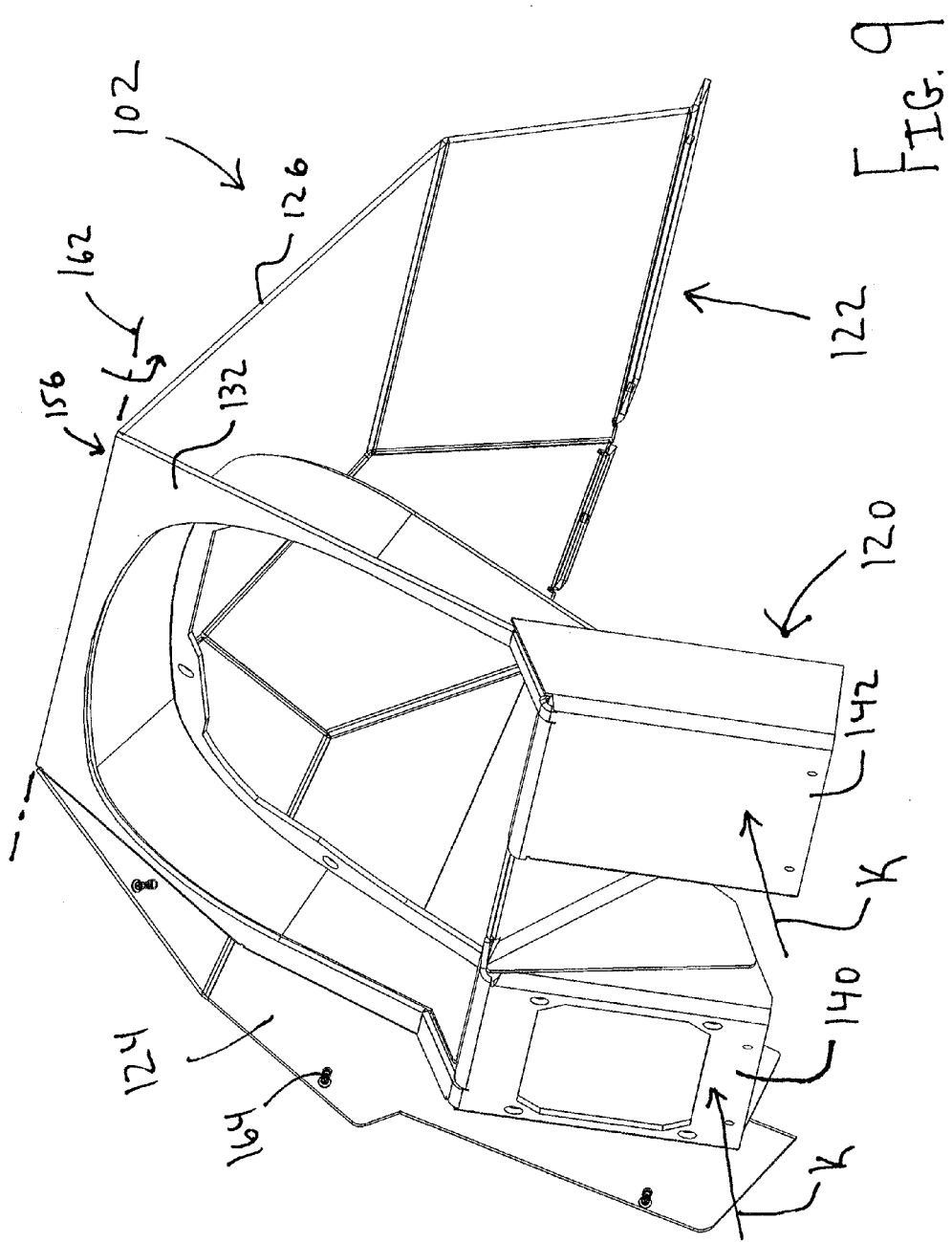
FIG. 9 is a perspective illustration of the dash assembly of FIG. 8 in the deformed state.

The second interface is provided by a plurality of overlapping portions of the rear moveable panel section 120 and the front stationary section 122 that are fastened by rivets 164 to provide overlapping interfaces. With reference to FIGS. 9 and 11, the second interface is a releasable interface configured to release to allow the rear moveable panel section 120 to pivot relative to the front stationary section 122 via hinge 162 upon sufficient force K being applied to the contact zones (e.g. pods 140, 142) of the rear moveable section 120, which are, in this embodiment, vertically below the first interface. In the illustrated embodiment, the second interface is a release interface where the rivets 164 will release under sufficient force K to allow the rear moveable panel section 120 to rotate through hinge 162. In some embodiments, the rivets 164 will release at a force K (combined applied to both pods 140, 142) of less than 4,000 N (900 lbf).

In the illustrated embodiment, there are three overlapping locations that provide the second interface. The left pod 140 includes a forward extending side flange 170 that overlaps with a lower portion 172 of the side panel 124. One of the rivets 164 extends through the side flange 170 and the lower portion 172 to mechanically secure the two portions and provide some limited support therebetween. The rear fascia panel 132 includes an intermediate and top side flange 174, 176, each of which extends forward from the rear fascia panel 132 (i.e. away from the seat of the vehicle). The intermediate side flange 174 overlaps with an intermediate portion 178 of the side panel 124. One of the rivets 164 secures the intermediate side flange 174 to the intermediate portion 178 of side panel 124. Finally, the top side flange 176 overlaps with a top canted portion 180 of the side panel 124. A rivet 164 mechanically secures these portions to one another. In some embodiments, the three overlapping locations will release in a progressive manner. More particularly, the overlapping location furthest from the first interface will release first and the overlapping location closest to the first interface will release last. In such a configuration, each overlapping location, and the corresponding rivets 164, may release at different forces. In some embodiments, the first rivet, closest to the floor of the vehicle or furthest from hinge 162 releases at between about 450 and 550 lbf (2000 to 2450 N), the second rivet, i.e. the middle rivet 164 releases at between about 350 and 450 lbf (1560 to 2000N) and the last rivet 164, i.e. the rivet closest hinge 162 releases at between 200 and 300 lbf (890 to 1340N).

As illustrated, the second interface is generally spaced away from the first interface (e.g. hinge 162/welded seam 156) and extends generally vertically relative to the occupant area 100. More particularly, the second interface has a more vertical orientation relative to the first interface which has a more horizontal orientation. This is because the second interface is provided between substantially vertically oriented side portions of the rear moveable panel section 120 and the front stationary section 122.

Figure 7:
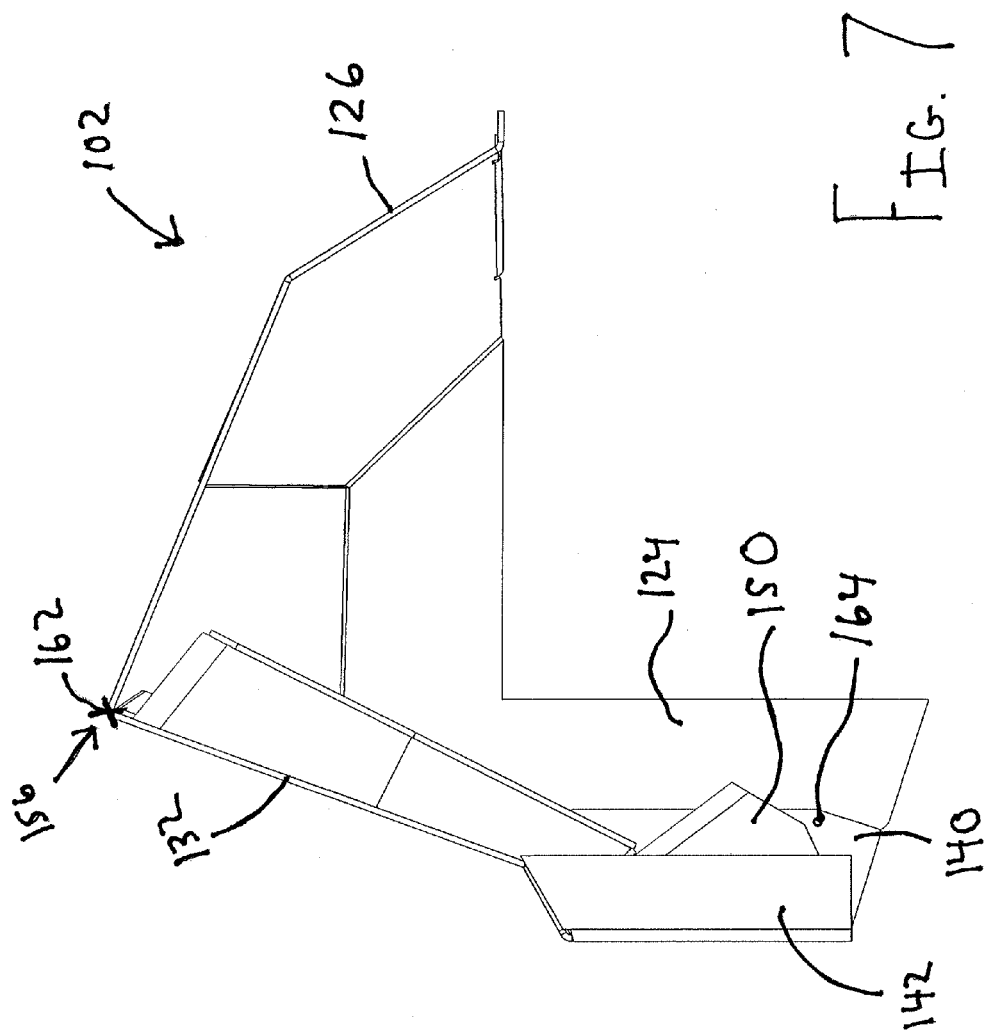
FIG. 7 is a side profile illustration of the dash assembly of FIGS. 2 and 3 in a normal state.
Figure 8:
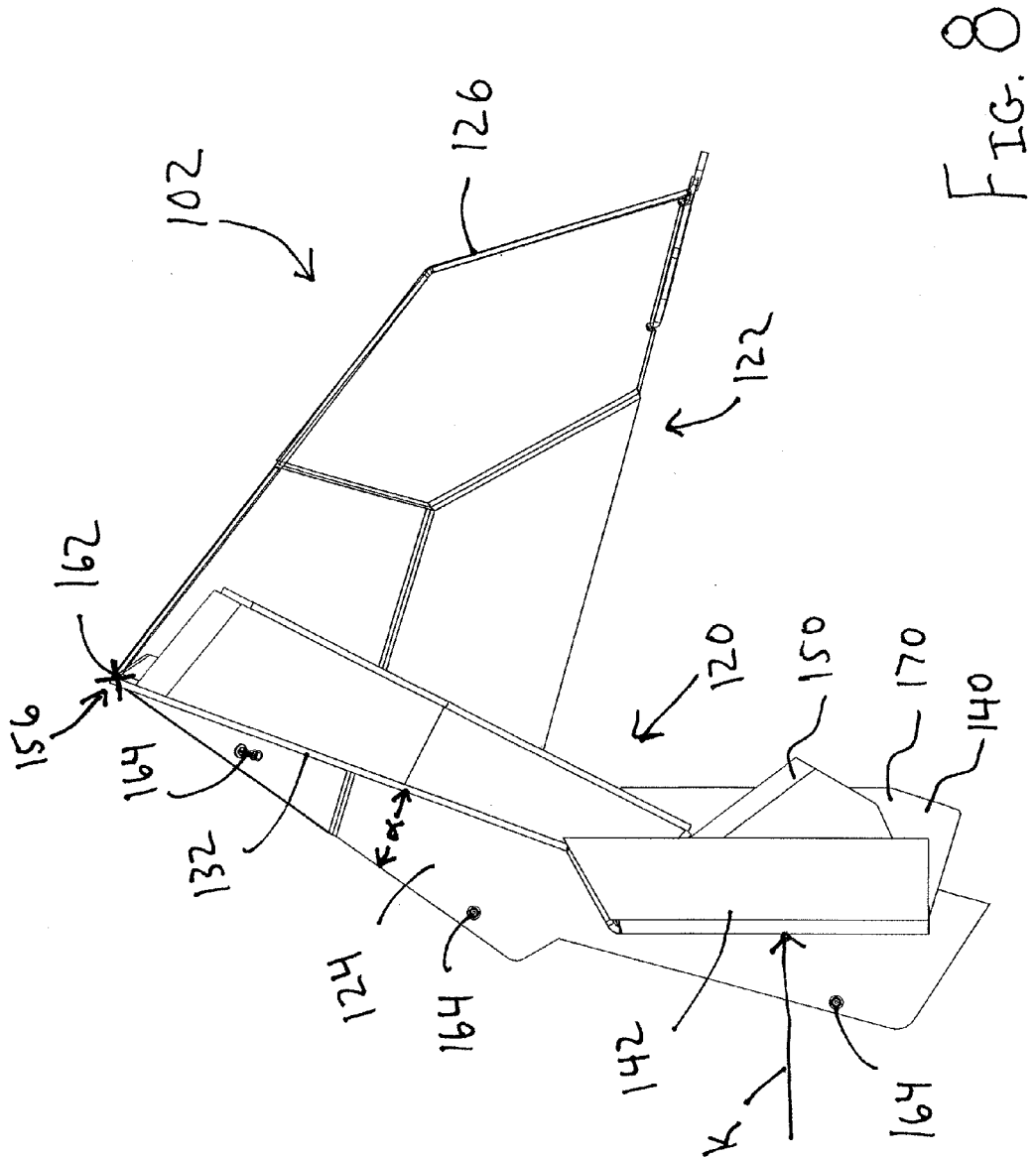
FIG. 8 is a side profile illustration of the dash assembly of FIG. 7 after a front end collision with the rear moveable panel section deformed relative to the front stationary section.

With reference to FIGS. 7 and 8, the dash assembly 102 is illustrated from the side prior to a front end collision (FIG. 7) and after a front end collision (FIG. 8).

In FIG. 7, the rear moveable panel section 120 is in its normal location relative to front stationary section 122. The rear moveable panel section 120 has not rotated relative to front stationary section 122 via hinge 162. Further, all of the rivets 164 secure a side of the rear moveable panel section 120 to the side panel 124 of the front stationary section 122.

In FIG. 8, a front end accident/collision has occurred. The rear moveable panel section 120 has rotated relative to the front stationary section 122 through hinge 162 formed by weld seam 156 illustrated by angle α. This deformation of the dash assembly 102 is provided by force K applied to the pods 140, 142 by the driver of the vehicle. More particularly, the driver's knees will apply a force to pods 140, 142 causing the deformation of the dash assembly 102. In some embodiments, this will result in a deformation of between about 0.75 and 2 inches of the pods 140, 142 in a forward direction.

Figure 10:
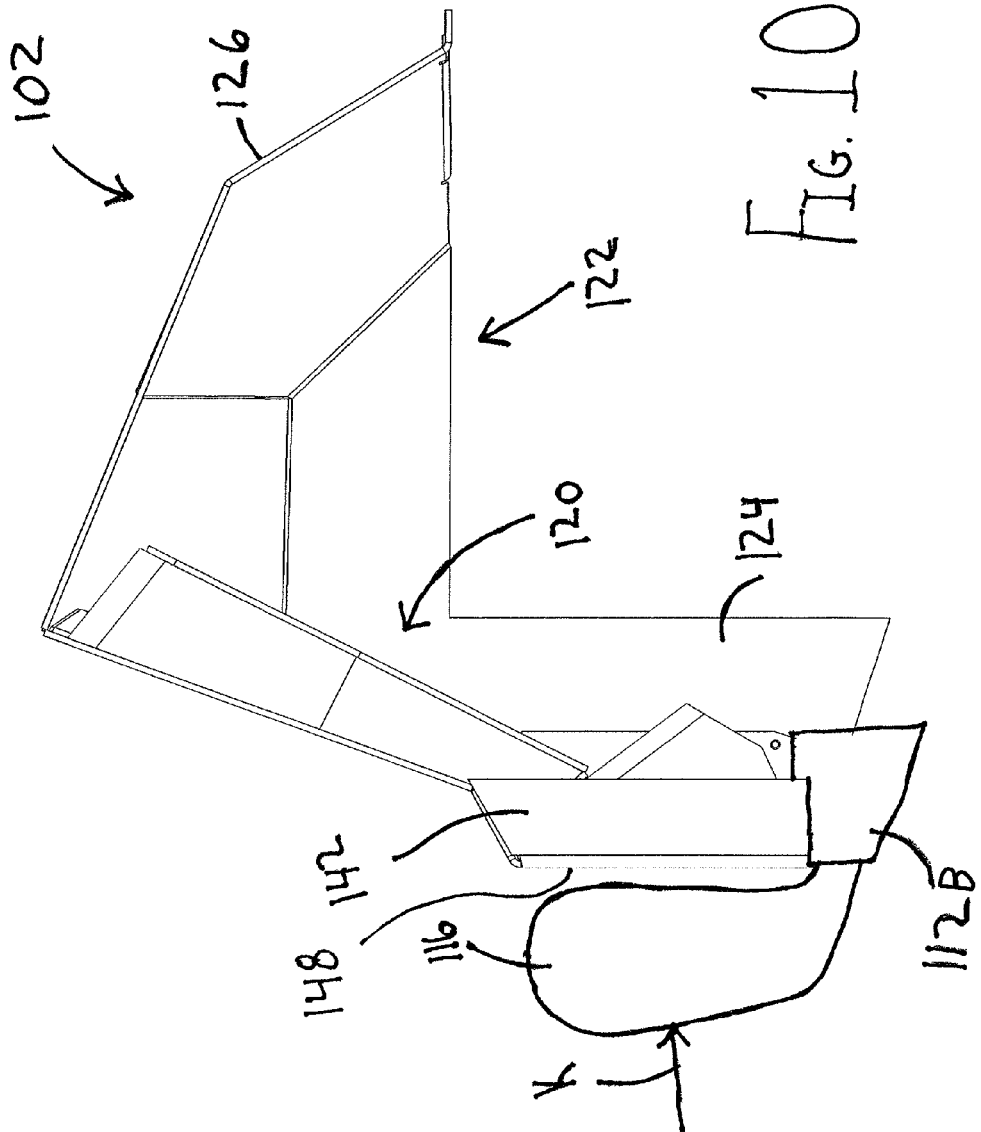
FIG. 10 is a profile illustration of the dash assembly of FIG. 7 and a portion of the knee airbag assembly with the airbag deployed.

In operation, with additional reference to FIGS. 10 and 11 in the event of a front end collision, the knee airbags 114, 116 will deploy and extend vertically upward and vertically adjacent pods 140, 142. The driver's knees will press against a first side of the deployed airbags that face the seat of the vehicle and the driver. The second, opposite, side of the deployed airbags 114, 116 will press against the pods 140, 142 and apply force K to the pods 140, 142. This force K will cause the deformation of the rear moveable panel section 120 to absorb some of the energy by the user to reduce injury to the driver's knees. This releasable feature of the rear moveable panel section 120 allows for the use of metal, and particularly aluminum, panels to be used to form the rear moveable panel section 120 of the dash assembly 102.

The rivets 164 of the second interface will release due to sufficient forces K applied by the driver's knees and provide only limited resistance to the deformation of the rear moveable panel section 120 through the first interface that is provided by welded seam 156 and hinge 162. If the side of the rear moveable panel section 120 were welded to the side panel 124, this additional resistance will reduce the amount of deformation and energy that will be absorbed by the dash assembly in the event of a crash and increase the impact forces to the driver's knees.

The front stationary section 122 will typically remain in a substantially fixed location relative to the framework of the vehicle.

In some embodiments, the knee airbag mounts 112A, 112B will also deform with the rear moveable panel section 120 of the dash assembly 102.

While the illustrated embodiment illustrates the entire rear moveable panel section 120 being able to pivot about hinge 162 at a top edge of the rear moveable panel section 120 and particularly the rear fascia panel 132 other embodiments are contemplated. For instance, some embodiments could include hinges proximate top edges of the pods 140, 142 such that they would deform relative to the rest of the rear section of the dash assembly 102. The pods 140, 142 could be the only portions that deform. Alternatively, hinge 162 could also be present such that several releasable points would be provided.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dash assembly for the occupant area of a vehicle comprising:
    a stationary section;
    a moveable section including at least one contact zone configured to be engaged by a driver's knee in the event of an accident to absorb forces from the driver's knee;
    a first interface between the stationary section and the moveable section and securing the moveable section to the stationary section at a first location;
    a second interface between the stationary section and the moveable section securing the moveable section to the stationary section at a second location spaced away from the first location, the second interface being configured to release prior to the first interface upon sufficient forces being applied to the at least one contact zone during an accident; and
    wherein the first interface is substantially horizontally oriented and the second interface is substantially vertically oriented.

2. The dash assembly of claim 1, wherein the first interface is a weld seam formed between the stationary section and the moveable section providing a hinge mechanism therebetween.

3. The dash assembly of claim 2, wherein the second interface is provided by an overlapping interface between the stationary section and the moveable section and includes at least one mechanical connection that extends through the overlapping interface.

4. The dash assembly of claim 3, wherein the at least one mechanical connection will release when the second interface releases to permit relative motion between the stationary section and the moveable section.

5. The dash assembly of claim 1, wherein the at least one contact zone is positioned vertically below the first interface and is substantially vertically oriented.

6. The dash assembly of claim 1, wherein the stationary section includes at least one mount for securement to the rest of the occupant area.

7. The dash assembly of claim 1, wherein the moveable section has a rear facing rear face and a front facing front face, the stationary section extends forward of the moveable section, the rear facing rear face facing the driver when mounted within the occupant area of a vehicle.

8. The dash assembly of claim 1, wherein the moveable section includes a pair of contact zones that are horizontally spaced apart from one another with a steering column channel being formed therebetween, one of the contact zones being positioned to align with a first knee of the driver and the other one of the contact zones being positioned to align with a second knee of the driver.

9. An occupant area for a vehicle comprising:
    a dash assembly comprising:
        a stationary section;
        a moveable section including at least one contact zone configured to be engaged by a driver's knee in the event of an accident to absorb forces from the driver's knee;
        a first interface between the stationary section and the moveable section and securing the moveable section to the stationary section at a first; and
        a second interface between the stationary section and the moveable section securing the moveable section to the stationary section at a second location spaced away from the first location, the second interface being configured to release prior to the first interface upon sufficient forces being applied to the at least one contact zone during an accident; and a knee airbag assembly including at least one airbag having a deployed state in which the airbag is located in rear of the at least one contact zone; and wherein the first interface is a substantially horizontally oriented weld seam formed between the stationary section and the moveable section location providing a hinge mechanism and the second interface is substantially vertically oriented.

10. The occupant area of claim 9, wherein the knee airbag assembly includes a knee airbag mount, the moveable section being attached to the knee airbag mount at a third interface spaced away from the first and second interfaces.

11. The occupant area of claim 9, wherein the second interface is provided by an overlapping interface between the stationary section and the moveable section and includes at least one mechanical connection that extends through the overlapping interface.

12. The occupant area of claim 11, wherein the at least one mechanical connection will release when the second interface releases to permit relative motion between the stationary section and the moveable section.

13. The occupant area of claim 12, further comprising a vehicle framework to which the dash assembly and knee airbag assembly are operably mounted, the stationary section includes at least one mount for securement of the dash assembly to the vehicle framework, the stationary section remaining in a fixed orientation relative to the vehicle framework when the mechanical connection releases.

14. The occupant area of claim 9, wherein further comprising a windshield that has a portion through which the driver looks, the moveable section has a rear facing rear face and a front facing front face opposite the rear facing rear face, the stationary section extends forward of the moveable section towards the portion of the windshield through which the driver looks, the rear facing rear face facing the driver.

15. The occupant area of claim 9, wherein the moveable section includes a pair of contact zones that are horizontally spaced apart from one another with a steering column channel being formed therebetween, one of the contact zones being positioned to align with a first knee of the driver and the other one of the contact zones being positioned to align with a second knee of the driver, the knee airbag assembly including a pair of knee airbags with one knee airbag associated with one of the contact zones and the other one of the knee airbags associated with the other one of the contact zones.

16. An occupant area for a vehicle comprising:
a dash assembly comprising:
a stationary section;
a moveable section including at least one contact zone configured to be engaged by a driver's knee in the event of an accident to absorb forces from the driver's knee;
a first interface between the stationary section and the moveable section and securing the moveable section to the stationary section at a first; and
a second interface between the stationary section and the moveable section securing the moveable section to the stationary section at a second location spaced away from the first location, the second interface being configured to release prior to the first interface upon sufficient forces being applied to the at least one contact zone during an accident; and
a knee airbag assembly including at least one airbag having a deployed state in which the airbag is located in rear of the at least one contact zone; and
wherein the at least one contact zone is positioned vertically below the first interface and is substantially vertically oriented, the at least one contact zone being vertically above the knee airbag assembly prior to deployment of the at least one air bag.

* * * * *